United States Patent
Takagi et al.

(10) Patent No.: US 8,099,982 B2
(45) Date of Patent: Jan. 24, 2012

(54) METHOD OF MOLDING GLASS PARTS AND MOLDING APPARATUS

(75) Inventors: Hideki Takagi, Tsukuba (JP); Masaharu Takahashi, Tsukuba (JP); Ryutaro Maeda, Tsukuba (JP); Shinichi Miyazawa, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 354 days.

(21) Appl. No.: 12/531,815

(22) PCT Filed: Mar. 26, 2008

(86) PCT No.: PCT/JP2008/055686
§ 371 (c)(1),
(2), (4) Date: Sep. 17, 2009

(87) PCT Pub. No.: WO2008/123293
PCT Pub. Date: Oct. 16, 2008

(65) Prior Publication Data
US 2010/0112341 A1 May 6, 2010

(30) Foreign Application Priority Data

Mar. 29, 2007 (JP) ................................ 2007-087987
Mar. 19, 2008 (JP) ................................ 2008-070852

(51) Int. Cl.
*C03B 11/00* (2006.01)
*B29D 11/00* (2006.01)
(52) U.S. Cl. ............. 65/305; 65/319; 264/449; 264/451
(58) Field of Classification Search ............ 65/305–322; 264/1.1–2.7
See application file for complete search history.

(56) References Cited

U.S. PATENT DOCUMENTS 2,179,261 A * 11/1939 Keller ........................... 219/777
2,795,512 A *  6/1957 Sherratt et al. ................ 427/470
(Continued)

FOREIGN PATENT DOCUMENTS

JP           6-100322  A      4/1994
(Continued)

OTHER PUBLICATIONS

Machine Translation of JP 06-100322 as viewed at http://dossier1.ipdl.inpit.go.jp/cgi-bin/tran_web_cgi_ejje?u=http%3A%2F%2Fdossier1%25.*

(Continued)

*Primary Examiner* — Matthew Daniels
*Assistant Examiner* — Jodi C Franklin
(74) *Attorney, Agent, or Firm* — Birch, Stewart, Kolasch & Birch, LLP (57) ABSTRACT

A molding apparatus of a glass material according to the present invention is characterized by containing means for holding a glass material and a molding die in contact with each other, means for heating the glass material and the molding die, and means for applying a voltage across the glass material and the molding die, in which press-molding is performed by electrostatic attraction acting between a surface of the glass material and a surface of the molding die. Further, a molded product of a glass material according to the present invention is characterized by including an alkali metal as a component, in which a concentration of the alkali metal is lowered in vicinity of a surface to be molded as compared with that of a glass base material.

22 Claims, 6 Drawing Sheets

U.S. PATENT DOCUMENTS

| | | | | |
|---|---|---|---|---|
| 3,329,490 | A | * | 7/1967 | Jendrisak .......................... 65/26 |
| 4,842,633 | A | * | 6/1989 | Kuribayashi et al. ............. 65/44 |
| 5,344,476 | A | * | 9/1994 | Tomida ........................... 65/102 |
| 6,279,346 | B1 | * | 8/2001 | Ribes et al. ..................... 65/25.4 |
| 6,951,119 | B1 | * | 10/2005 | Quenzer et al. ................. 65/102 |
| 7,364,930 | B2 | * | 4/2008 | Quenzer et al. ................. 438/48 |
| 2004/0123628 | A1 | * | 7/2004 | Stoehr et al. .................... 65/102 |
| 2005/0239228 | A1 | | 10/2005 | Quenzer et al. |
| 2009/0142669 | A1 | * | 6/2009 | Shinohara et al. ............ 429/320 |
| 2009/0174118 | A1 | * | 7/2009 | Maeda et al. ................. 264/323 |
| 2011/0074055 | A1 | * | 3/2011 | Nakahashi et al. .......... 264/1.36 |
| 2011/0199687 | A1 | * | 8/2011 | Sellier et al. ................. 359/652 |

FOREIGN PATENT DOCUMENTS

| | | |
|---|---|---|
| JP | 6-345448 A | 12/1994 |
| JP | 2003-54961 A | 2/2003 |
| JP | 2003-514756 A | 4/2003 |
| JP | 2006-240906 A | 9/2006 |
| JP | 2006-269919 A | 10/2006 |
| JP | 2006-326927 A | 12/2006 |
| JP | 2007-19451 A | 1/2007 |
| WO | WO-01/38240 A1 | 5/2001 |

OTHER PUBLICATIONS

Yoshihiko Hirai., "Nanostructure Fabrication by Nanoimprint Technology", Journal of the Japan Society for Precision Engineering, vol. 70, No. 10, 2004, pp. 1223-1227.

Miyauchi at al., "NanoImprint Technology", Journal of Japan Institute of Electronics Packaging, vol. 7, No. 6, 2004, pp. 497-500.

Takahashi et al., "Large-Area Micro-Hot Embossing of Glass Materials with Glassy Carbon Mold Machined by Dicing", Journal of the Japan Society for Technology of Plasticity, vol. 47, No. 549, 2006, pp. 963-967.

Hirai et al., "Fine Pattern Fabrication on glass surface by imprint lithography", Microelectronic Engineering 67-68, 2003, pp. 237-244.

* cited by examiner

METHOD OF MOLDING GLASS PARTS AND MOLDING APPARATUS

TECHNICAL FIELD

The present invention relates to mold processing of a glass material. The present invention, for example, relates to a technology for forming a micropattern on a surface of glass. In particular, the present invention is used for fabrication of an optical element used for various optical components or display devices, an optical control device employing a MEMS (Micro Electro Mechanical System), a biochemical analysis device called μ-TAS, a micro-total analysis device, a microchemical synthesis device, and the like.

BACKGROUND ART

In display devices such as flat panel displays or projectors, which have been significantly expanded in recent years, an optical element containing a large number of microstructures having a lens function or a light-scattering function is provided in front and in rear of each pixel to transmit a larger amount of light to realize a brighter image. In micro-total analysis devices, chemical synthesis devices, and fluid-controlling systems, each employing a MEMS, a microstructure is formed on a surface of glass, and the microstructures are joined with each other, to fabricate a liquid flow path or various analytical reaction system. For such a purpose, a glass material excellent in optical characteristics and chemical stability is expected to be used. However, processing employing a semiconductor process such as dry-etching has a low processing efficiency for the glass material. Therefore, an efficient processing method for fabricating a three-dimensional microstructure is expected to be developed.

Figure 1:
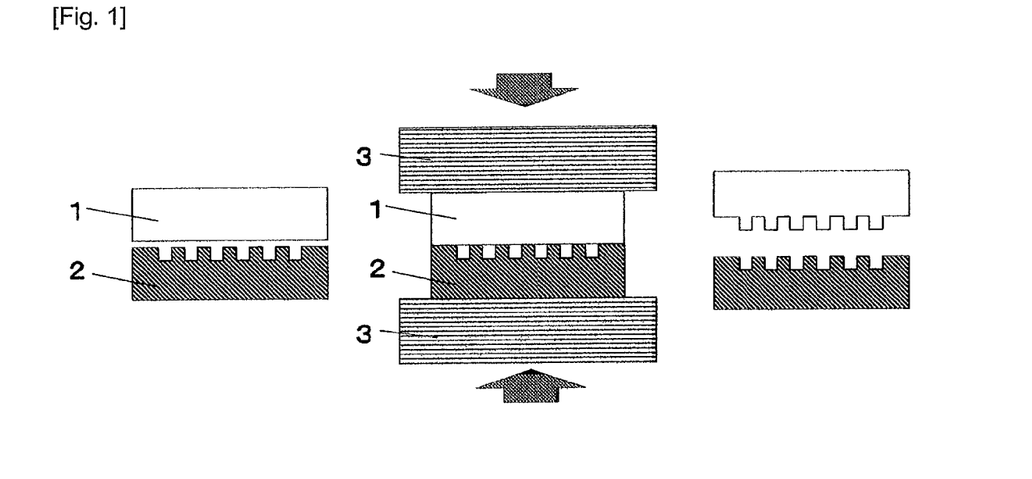
FIG. 1 is a schematic front view illustrating a conventional molding method by heating and pressing.

As a method for fabricating a large amount of three-dimensional microstructures at low cost, micromolding technology employing a molding die is promising. As illustrated in FIG. 1, the micromolding technology is for replicating a profile by pressing a molding die against a material to be molded at a temperature which allows the material to be molded to be softened. In the case where the material to be molded is a resin material, the processing is possible at a relatively low temperature. For this reason, the micromolding technology has already been spread for a large number of devices. Further, the profile can be replicated with nanometer-order accuracy in the molding employing the die. Therefore, such micromolding technology has been actively developed as nanoimprint technology (see Non-Patent Literatures 1 and 2 and Patent Literature 1).

Increase in area of molding is also an important issue for increasing a speed and an efficiency of a molding step. However, if the area to be molded at one time is increased, a necessary load is proportionally increased. Therefore, a pressure means is extremely increased in size, which in turn results in remarkably increased size of a molding apparatus. In addition, it becomes difficult to uniformly apply a pressure to a region to be molded. In order to solve these problems, a load means employing a fluid as a medium (see Patent Literature 2) and a method for scanning the entire area to be molded with a pressure head which is relatively small as compared with the area to be molded (see Patent Literature 3) have been developed.

For the molding of the glass substrate by employing the micromolding technology as described above, a molding process at a higher temperature is required because the glass material has a higher softening temperature than that of the resin material. The use of low-melting-point glass as the molding material allows a process temperature to be lowered to a certain degree (see Non-Patent Literature 3). However, there is a problem that various additive elements contained in the low-melting-point glass affect optical performance or chemical stability. Though a process and an apparatus which enable the molding at a high temperature have been developed for molding high-melting-point glass (see Non-Patent Literature 4), the molding apparatus is required to have several heat-shielding structures or heat-insulating materials to realize the high-temperature process. Thus, there is a problem that the apparatus is increased in size. Moreover, the glass requires a larger pressure for molding as compared with that required for the resin material, and hence means for applying a large load is required. Therefore, there also arises a problem that the apparatus becomes large. Further, in order to prevent the molding die from degrading in the high-temperature molding and to prevent poor molding due to gas confinement, the molding is required to be performed in a vacuum, which becomes another factor of the increase in size of the apparatus.

On the other hand, the high-temperature molding requires a long time for heating and cooling, and hence the molding over a large area is important for improving the efficiency of the molding step. However, a weight uniformization means using the fluid as the medium or the like cannot be used at a high temperature. Moreover, the application of the scanning method with the pressure head is also difficult in view of heat shield of the entire mechanism and the accommodation of the mechanism in a vacuum chamber. Therefore, for molding of the glass material over a large area, the apparatus becomes extremely large in size and expensive.

Further, a burden imposed on the molding die becomes large in the molding under the conditions of a high temperature and a large load. Thus, the cracking of the molding die also becomes a problem.

[Non-Patent Literature 1] "Nanostructure Fabrication by Nanoimprint Technology" by Hirai, Journal of the Japan Society for Precision Engineering, vol. 70, No. 10, 2004, pp. 1223-1227

[Non-Patent Literature 2] "Nanoimprint Technology" by Miyauchi, Kuwahara and Ogino, Journal of Japan Institute of Electronics Packaging, vol. 7, No. 6, 2004, pp. 497-500

[Non-Patent Literature 3] Y. Hirai, K. Kanakugi, T. Yamaguchi, K. Yao, S. Kitagawa, Y. Tanaka, "Fine pattern fabrication on glass surface by imprint lithography", Microelecron. Eng., Vol. 67-68, 2003, pp. 237-244

[Non-Patent Literature 4] "Large-Area Micro-Hot Embossing of Glass Materials with Glassy Carbon Mold Machined by Dicing" by Takahashi and Maeda, Journal of the Japan Society for Technology of Plasticity, vol. 47, No. 549, 2006, pp. 963-967

[Patent Literature 1] JP-A-2006-269919 ("JP-A" means unexamined published Japanese patent application)

[Patent Literature 2] JP-A-2006-326927

[Patent Literature 3] JP-A-2007-19451

DISCLOSURE OF INVENTION

Technical Problem

In order to solve the problems in micromolding of the glass, according to the present invention, there can be provided a technology for enabling molding of a glass without applying a large load. Further, according to the present invention, there can be provided a technology for enabling molding of a glass at a lower temperature. Further, according to the present invention, there can be provided a technology for performing uniform molding over a large area without requiring a large complex means.

In addition, according to the present invention, it is possible to prevent a surface of a molding die from being oxidized, facilitate release of the molding die from a glass, and improve durability of the molding die.

Solution to Problem (1) A method of molding a glass material according to the present invention is characterized by comprising the steps of:
heating a glass material and a molding die;
applying a voltage across the glass material and the molding die while the glass material and the molding die are being held in contact with each other; and
performing glass material pressure-molding by electrostatic attraction generated between a surface of the glass material and a surface of the molding die.

(2) Further, a method of molding a glass material according to the present invention is characterized in that, in the above-mentioned item (1), a negative direct-current voltage is applied to the glass material, and a positive direct-current voltage is applied to the molding die.

(3) Further, a method of molding a glass material according to the present invention is characterized in that, in the above-mentioned item (1) or (2), the glass material contains a mobile ion.

(4) Further, a method of molding a glass material according to the present invention is characterized in that, in the above-mentioned item (3), the glass material comprises silicon dioxide as a main component, and lithium, sodium or potassium corresponding to an alkali metal as the mobile ion.

(5) Further, a method of molding a glass material according to the present invention is characterized in that, in the above-mentioned item (4), a content of the alkali metal is 2% or larger and 25% or less in ratio by weight.

(6) Further, a method of molding a glass material according to the present invention is characterized in that, in any one of the above-mentioned items (1) to (5), the temperature T for heating the glass material and the molding die is within a range of: $(T_g-150)° C.<T<(T_g+100)° C.$ (in which "$T_g$" represents a glass transition temperature of the glass material).

(7) Further, a method of molding a glass material according to the present invention is characterized in that, in any one of the above-mentioned items (1) to (5), the temperature T for heating the glass material and the molding die is within a range of: $(T_g-100)° C.<T<T_g° C.$ (in which "$T_g$" represents a glass transition temperature of the glass material).

(8) Further, a method of molding a glass material according to the present invention is characterized in that, in any one of the above-mentioned items (1) to (7), the applied voltage is 10 V or larger and 10,000 V or less.

(9) Further, a method of molding a glass material according to the present invention is characterized in that, in any one of the above-mentioned items (1) to (7), the applied voltage is 100 V or larger and 2,000 V or less.

(10) Further, a method of molding a glass material according to the present invention is characterized in that, in any one of the above-mentioned items (1) to (9), further comprising the step of applying a pressure to the glass material and the molding die after the step of heating the glass material and the molding die.

(11) Further, a method of molding a glass material according to the present invention is characterized in that, in the above-mentioned item (10), the applied pressure is 100 Pa or larger and 1 MPa or smaller.

(12) Further, a method of molding a glass material according to the present invention is characterized in that, in any one of the above-mentioned items (1) to (11), the molding is performed in a vacuum.

(13) Further, a method of molding a glass material according to the present invention is characterized in that, in the above-mentioned item (12), a pressure of a residual gas in the vacuum atmosphere is 1 Pa or smaller.

(14) Further, a method of molding a glass material according the present invention is characterized in that, in any one of the above-mentioned items (1) to (11), the molding is performed in a nitrogen gas atmosphere or an inert gas atmosphere.

(15) Further, a method of molding a glass material according to the present invention is characterized in that, in any one of the above-mentioned items (1) to (14), a positive direct-current voltage is applied to the glass material and a negative direct-current voltage is applied to the molding die, prior to release of the molding die after the molding.

(16) Further, a method of molding a glass material according to the present invention is characterized in that, in any one of the above-mentioned items (1) to (14), an alternating-current voltage is applied across the glass material and the molding die, prior to the release of the molding die after the molding.

(17) Further, a method of molding a glass material according to the present invention is characterized in that, in the above-mentioned item (15) or (16), the heating temperature $T_1$ at the time of applying the voltage is within a range of: $(T_g-150)° C.<T_1<T_g° C.$ (in which "$T_g$" represents a glass transition temperature of the glass material).

(18) Further, a molding apparatus of a glass material according to the present invention is characterized by containing:
means for holding a glass material and a molding die in contact with each other;
means for heating the glass material and the molding die; and
means for applying a voltage across the glass material and the molding die, and characterized in that
press-molding is performed by electrostatic attraction acting between a surface of the glass material and a surface of the molding die.

(19) Further, a molding apparatus of a glass material according to the present invention is characterized in that, in the above-mentioned item (18), a negative electrode is connected to the glass material and a positive electrode is connected to the molding die, to thereby perform application of a direct-current voltage.

(20) Further, a molding apparatus of a glass material according to the present invention is characterized by containing, in the above-mentioned item (18) or (19), an electrode for applying the voltage, and characterized in that the electrode is brought into contact with an entire surface on a side opposite to a surface, which is to be molded, of the glass material.

(21) Further, a molding apparatus of a glass material according to the present invention is characterized in that, in any one of the above-mentioned items (18) to (20), a conductive film formed on a surface on a side opposite to a surface, which is to be molded, of the glass material is employed as an electrode for performing electrical connection to the glass material.

(22) Further, a molding apparatus of a glass material according to the present invention is characterized in that, in any one of the above-mentioned items (18) to (21), the molding die is a conductor.

(23) Further, a molding apparatus of a glass material according to the present invention is characterized in that, in the above-mentioned item (22), the molding die is formed of a material containing any one of platinum, iridium, rhodium, osmium and ruthenium as a main component, or a material containing a mixture of at least two of the materials as a main component.

(24) Further, a molding apparatus of a glass material according to the present invention is characterized in that, in the above-mentioned item (22), a thin film made of a material containing any one of platinum, iridium, rhodium, osmium and ruthenium as a main component, or a material containing a mixture of at least two of the materials as a main component, is formed on a surface of the molding die.

(25) Further, a molding apparatus of a glass material according to the present invention is characterized in that, in any one of the above-mentioned items (18) to (24), a depth of a molding pattern of the molding die is 1 μm or less.

(26) Further, a molding apparatus of a glass material according to the present invention is characterized by having, in any one of the above-mentioned items (18) to (25), means for reversing polarity of the voltage applied to the glass material and the molding die.

(27) Further, a molding apparatus of a glass material according to the present invention is characterized by containing, in any one of the above-mentioned items (18) to (26), means for holding the glass material and the molding die with pressing force.

(28) Further, a molding apparatus of a glass material according to the present invention is characterized in that, in the above-mentioned item (27), an applied pressure at the time of holding with pressing force is 100 Pa or larger and 1 MPa or smaller.

(29) Further, a molding apparatus of a glass material according to the present invention is characterized by containing, in any one of the above-mentioned items (18) to (28), a vacuum chamber for performing the molding in a vacuum.

(30) Further, a molding apparatus of a glass material according to the present invention is characterized by containing, in any one of the above-mentioned items (18) to (29), an atmosphere-controlling chamber for performing the molding in various gas atmospheres.

(31) Further, a molded product of a glass material according to the present invention is characterized by containing an alkali metal as a component, and characterized in that a concentration of the alkali metal is lowered in vicinity of a surface to be molded as compared with that of a glass base material.

(32) Further, a molded product of the glass material according to the present invention is characterized in that, in the above-mentioned item (31), a thickness of a region having the lowered concentration of the alkali metal is 0.1 μm or larger and 5 μm or less.

ADVANTAGEOUS EFFECTS OF INVENTION

The present invention produces excellent effects as follows.

(1) By the application of the voltage across the glass and the molding die, the electrostatic attraction acts between the glass and the molding die to perform the molding. Therefore, a load externally applied at the time of molding is not required or can be significantly reduced. As a result, means for applying a load is not required or can be significantly reduced in size and simplified. Accordingly, the molding apparatus can be reduced in size as well as in cost, which in turn can reduce the cost of the molding process.

(2) Further, the external load can be remarkably reduced. In addition, the electrostatic attraction uniformly acts on the entire area to be molded. Therefore, there is no concentration of the load, and hence the glass material and the molding die can be prevented from being broken by the load.

(3) The electrostatic attraction acts only on the vicinity of a contact area between the glass and the molding die. Therefore, even when a sufficient molding force is applied to an area of glass, which is to be molded, the force applied to the other area can be made relatively small. Thus, even if the molding is performed with the glass material in a softened state, only the area to be molded can be molded without deforming the other area of the glass material by pressing.

(4) Moreover, with the electrostatic attraction, a remarkably large molding force can be locally applied. In particular, due to electric field concentration, a larger force also acts on an area such as a corner of the molding die, which is difficult to mold by general methods. Therefore, the molding with higher accuracy is possible. Further, the molding can be performed even when the glass is not sufficiently softened yet. Thus, the molding can be performed at a lower temperature. As a result, a heat-shielding and heat-insulating structure of the molding apparatus can be simplified to enable the reduction in size and cost of the molding apparatus.

(5) Further, the reduction in molding process temperature can prevent the molding die from being degraded. The increased lifetime of the die can reduce the cost of the die and the time required for replacing the die, and hence productivity is improved.

(6) Moreover, the electrostatic attraction uniformly acts on the entire area to be molded and a necessary voltage to be applied remains the same even for a larger area, and hence large-area molding becomes possible with a simple apparatus without employing a large complex load application means.

(7) The molding die is formed of a material containing, as a main component, any one of platinum, iridium, rhodium, osmium and ruthenium, or a material containing a mixture of at least two of the materials as a main component. Alternatively, a thin film, which is formed of a material containing, as a main component, any one of platinum, iridium, rhodium, osmium and ruthenium, or a material containing a mixture of at least two of the materials as a main component, is formed on the surface of the molding die. As a result, the molding die has high resistance against an oxidizing atmosphere at the time of molding, while the release of the molding die after the molding is easy. Thus, the lifetime of the molding die can be improved.

EXPLANATION OF REFERENCE

1 Material to be molded
2 Molding die
3 Heater
10 Glass material
11 Power supply
12 Electrode for glass
13 Electrode for molding die
21 Cation
22 Negative charge
23 Positive charge
24 Electrostatic attraction
26 Oxygen ion
27 Active free oxygen atom
31 Contact-holding means
32 Chamber
33 Pressure-holding means
41 Molded product of glass
42 Glass base material
43 Region having a lowered concentration of alkali metal

BEST MODE FOR CARRYING OUT THE INVENTION

Hereinafter, an embodiment of a method of molding a glass material, a molding apparatus and a molded product of a glass material according to the present invention is described in detail referring to the drawings.

Figure 2:
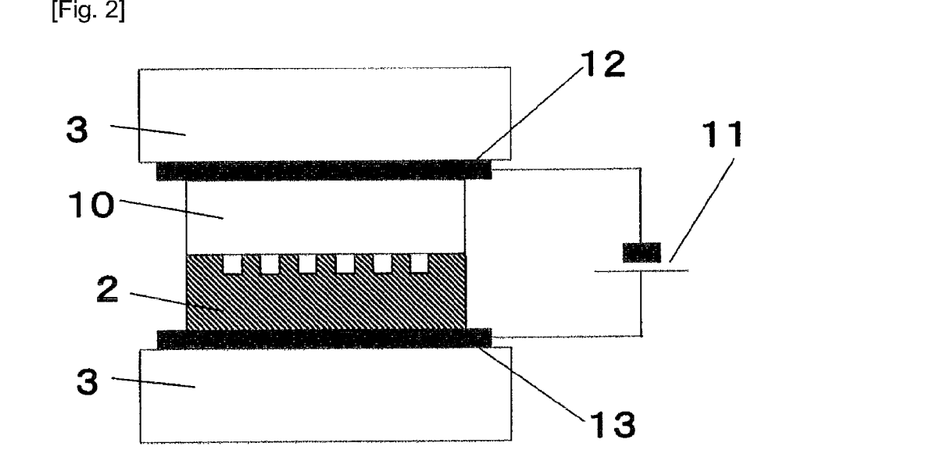
FIG. 2 is a schematic front view illustrating a method of molding a glass according to the present invention.

FIG. 2 shows the method of molding a glass material according to the present invention. The glass material 10 and the molding die 2 are heated by the heaters 3 while being held in contact with each other. A voltage is applied across the heated glass material 10 and molding die 2 by the power supply 11 through the electrodes 12 and 13. As a result, an electrostatic attraction is generated between the glass material 10 and the molding die 2, thereby molding the glass material 10. Though the heaters 3 are provided respectively in contact with the glass material 10 and the molding die 2 in the drawing, any heating means and arrangement may be used as long as the glass material 10 can be heated to a predetermined temperature.

For the voltage, it is desirable to connect a negative electrode to the glass material 10 and a positive electrode to the molding die 2 to apply a direct-current voltage therebetween. With such polarity, a larger electrostatic attraction can be obtained.

Figure 3:
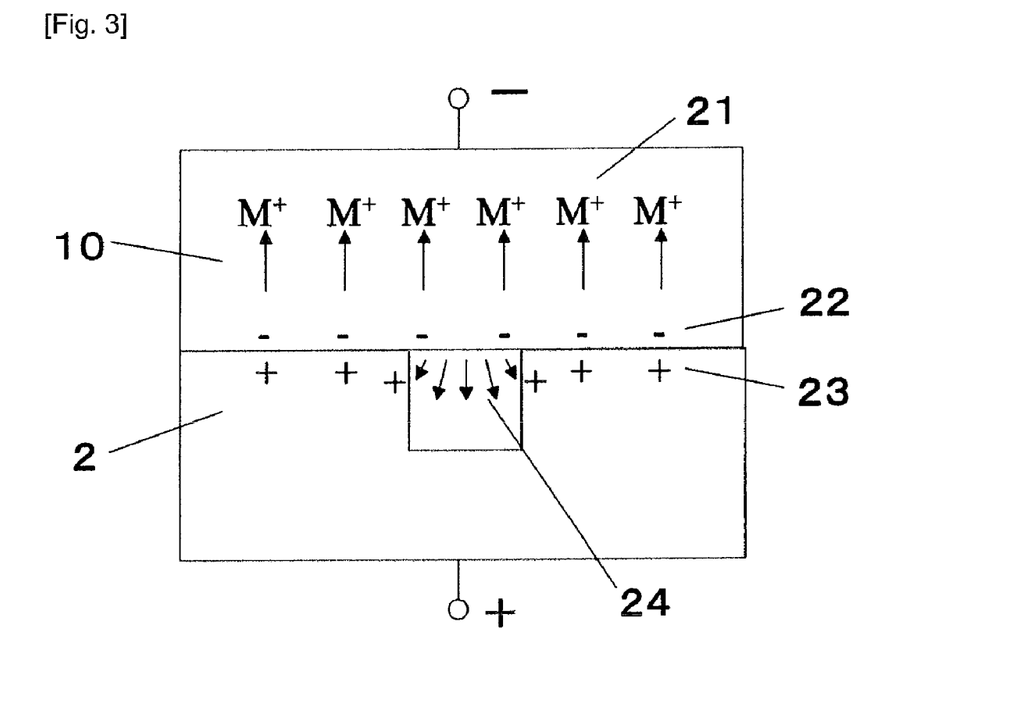
FIG. 3 is an explanatory view illustrating a relation between ion migration caused by application of a voltage and an electrostatic attraction generated between a surface of a glass, which is to be molded, and a surface of a die, in the method of molding a glass according to the present invention.

As shown in FIG. 3, inside the glass material, the cations 21 such as an alkali metal contained in the glass material are migrated from a surface to be molded in a direction toward the negative electrode by an electric field. On the other hand, oxygen ions bonded to the migrated cations are also firmly bonded to elements such as silicon corresponding to a main component of the glass. Therefore, the oxygen ions cannot migrate as the cations do. As a result, the negative charges 22 are accumulated in the surface of the glass material, which is to be molded. In response to the negative charges, the positive charges 23 are induced in a surface of the molding die, which is in contact with the glass material. The accumulation of the negative charges 22 and the positive charges 23 generates a large electrostatic attraction 24 in a contact area between the glass material and the molding die. As a result, the glass material 10 is deformed, thereby performing molding. In particular, due to electric field concentration, a larger force also acts on an area such as a corner of the molding die, which is difficult to mold by general methods. Thus, the molding with higher accuracy can be performed.

Here, the direct-current voltage is not limited to a constant voltage, but includes a voltage changing in terms of time or space with fixed polarity.

Figure 4:
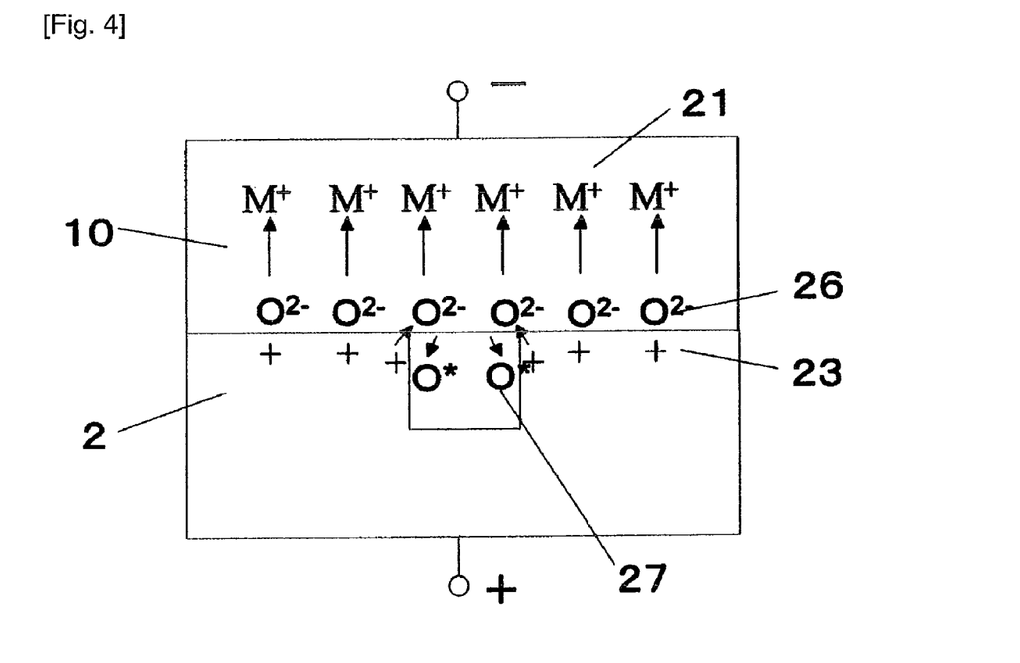
FIG. 4 is an explanatory view illustrating a state of generation of active free oxygen in a contact area between a glass material and a molding die, which occurs with application of a voltage.

As described above, the negative voltage is applied to the glass material 10, whereas the positive voltage is applied to the molding die 2. As a result, the negative charges are accumulated in the surface of the glass material 10 and the positive charges are accumulated in the surface of the molding die 2 due to the migration of the cations inside the glass material 10. When the positive charges in the surface of the molding die 2 are bonded to the negative oxygen ions 26 which are excessively present in the glass material, the active free oxygen atoms 27 are generated as shown in FIG. 4. The vicinity of the contact area becomes a strong oxidizing atmosphere. Therefore, the molding die 2 is required to have high oxidation resistance.

It is desirable that the glass material to be molded be a glass material containing mobile ions such as an alkali metal. The mobile ions easily migrate in the glass by the voltage, and hence a larger number of negative charges 22 are accumulated in the surface of the glass, which is to be molded. As a result, a large electrostatic attraction can be obtained.

Further, it is desirable that the glass material contain silicon dioxide as a main component, and lithium, sodium or potassium, each corresponding to the alkali metal, as the mobile ion. The above-mentioned alkali metals easily migrate in the glass in a heated state. As a result, a larger electrostatic attraction can be obtained on the surface to be molded. Moreover, the above-mentioned alkali metals are contained in various glass raw materials. Therefore, a glass material for molding can be obtained at low cost without any special preparation. In addition, the silicon dioxide as the main component is bonded to the oxygen atoms in a complex many-to-many relation. Therefore, the migration of the oxygen atoms is restricted to correspondingly accumulate a larger number of negative charges in the surface of the glass, which is to be molded. As a result, a larger electrostatic attraction can be obtained.

Further, it is desirable that a content of the alkali metal in the glass material be 2% or larger. By setting the content in this range, the electrostatic attraction required for the molding can be obtained as a result of the migration of the alkali metal ions. Moreover, it is desirable that a content of the alkali metal in the glass material be 25% or less. By setting the content in this range, mechanical characteristics and chemical stability of the glass material are improved. Specifically, it is desirable that the content of the alkali metal be 2% or larger and 25% or less in ratio by weight. The ratio by weight here means, when the alkali metal is an oxide, a ratio of the oxide to the total weight of the glass material.

It is desirable that the electrode for electrical connection to the glass material have such a structure that the electrode comes into contact with the glass material on the entire surface on the side opposite to the surface of the glass material, which is to be molded. With such a structure, a strong electrical field is uniformly applied to the glass to accelerate the ion migration, thereby obtaining a large electrostatic attraction.

It is also desirable that a conductive film be formed on the side opposite to the surface of the glass material, which is to be molded, to be used as an electrode. By using the conductor film formed on the glass as the electrode, the electrode comes into close contact with the glass to prevent poor molding due to poor contact of the electrode. Further, by forming the conductor film over a large area on the side opposite to the surface of the glass material, which is to be molded, a strong electric field is uniformly applied to the glass to accelerate the ion migration, thereby obtaining a large electrostatic attraction.

It is desirable that the molding die be a conductor. By using the molding die 2 made of a conductive material, the positive charges 23 are accumulated in the surface of the die at a high density. As a result, a larger electrostatic attraction can be obtained.

When the voltage is applied across the glass material 10 and the molding die 2, there is a problem that the molding die 2 and the glass material 10 are firmly bonded to each other. Though the molding die 2 is required to have conductivity, the molding die 2 made of aluminum, chromium, titanium, silicon, tungsten, palladium or the like makes the release of the molding die 2 from the glass material 10 difficult. In addition, durability of the molding die 2 is extremely important in glass molding. Glassy carbon is considered as an excellent die material with low reactivity to glass and good releasability in general glass molding. In the molding method employing the application of the voltage, however, it is proved that the surface of the molding die 2 becomes an oxidizing atmosphere at a high temperature. Therefore, a surface of a glassy carbon die is heavily oxidized, failing to obtain a practically useful lifetime of the die. Though the release of the die made of a metal such as silver, copper and molybdenum is similarly easy, there is a problem that the surface of the die is corroded at the time of application of the voltage.

It is extremely effective to use platinum as a material which has high resistance against the oxidizing atmosphere at the time of molding and is easy to release after the molding. The use of iridium, rhodium, and an alloy thereof, which have a high-melting point and excellent oxidation resistance as in the case of platinum, is also effective. In addition to the above-mentioned materials, an alloy containing osmium or ruthenium, which is similarly excellent in corrosion resistance, as a main component is also effective. The use of the alloy allows for the improvement of a melting point, hardness and chemical stability of the molding die, thereby improving the lifetime of the molding die. Further, it is also possible to use an alloy containing the above-mentioned materials as the main component, which is obtained by adding other atoms.

As a structure of the molding die, the molding die is directly fabricated by using the single metal or the alloys described above. Alternatively, it is also effective to form a thin film made of the metals or the alloys described above on the surface of the molding die fabricated of other materials to impart conductivity and oxidation resistance.

It is desirable that a depth of the molding pattern formed on the molding die be 1 μm or less. As a distance between the surface to be molded and the surface of the die becomes smaller, the electrostatic attraction acting between the surface of the glass, which is to be molded, and the surface of the die becomes greater. Therefore, by setting the depth of the molding pattern in the above-mentioned range, a larger electrostatic attraction acts on the surface of the glass, which is to be molded. As a result, the molding can be performed at a lower temperature within a shorter period of time.

It is desirable that the voltage to be applied at the time of molding be 10 V or higher. By setting the voltage in this range, the cations can migrate in the glass. Moreover, it is desirable that the voltage to be applied at the time of molding be 10,000 V or less. By setting the voltage in this range, the configuration of the apparatus containing means for preventing discharge can be simplified. Specifically, it is desirable that the applied voltage at the time of molding be 10 V or higher and 10,000 V or less.

It is further desirable that the voltage to be applied at the time of molding be 100 V or larger. By setting the voltage in this range, a larger number of cations migrate in the glass at a higher migration rate. Therefore, the electrostatic attraction which is sufficiently large for the molding can be generated between the glass material and the molding die, and hence the molding can be performed at a lower molding temperature within a shorter period of time. It is also desirable that the voltage to be applied at the time of molding be 2,000 V or less. By setting the voltage in this range, the risk of breakdown between the glass material and the molding die, and the glass material and the molding die and the components of the molding apparatus is diminished, whereas an insulating structure can be simplified. Therefore, the molding with a smaller and simpler apparatus can be performed. Specifically, it is desirable that the voltage to be applied at the time of molding be 100 V or larger and 2,000 V or less.

It is desirable that the heating temperature T at the time of molding be higher than $(Tg-150)°$ C. when the glass transition temperature of the glass material is Tg. By setting the temperature in this range, the migration of the cations 21 in the glass is facilitated to accumulate a sufficient number of negative charges 22 in the surface of the glass, which is to be molded. It is also desirable that the heating temperature T at the time of molding be lower than $(Tg+100)°$ C. By setting the heating temperature in this range, a heating structure and a heat-shielding structure can be simplified. In addition, damages to the molding die can be reduced. Specifically, it is desirable that the heating temperature T at the time of molding be within the range of: $(Tg-150)°$ C.$<T<(Tg+100)°$ C.

Further, it is desirable that the heating temperature T at the time of molding be higher than $(Tg-100)°$ C. when the glass transition temperature of the glass material is Tg. By setting the temperature in this range, the glass material is softened to facilitate the molding. Moreover, it is desirable that the heating temperature T at the time of molding be lower than Tg. By setting the temperature in this range, the deformation of the glass material other than that of the surface to be molded can be minimized, while the glass is sufficiently softened for molding. Specifically, it is desirable that the heating temperature T at the time of molding be within the range of: $(Tg-100)°$ C.$<T<Tg°$ C.

It is desirable to apply pressure to the glass material and the molding die with an external load while the glass material and the molding die are being heated. According to the present invention, it is also possible to mold the glass material by the electrostatic attraction without applying an external mechanical load. However, if the surface of the glass, which is to be molded, and the surface of the die are not held in contact with each other, the electrostatic attraction acting thereon is remarkably reduced. When the surface of the glass, which is to be molded, and the surface of the die cannot be brought into close contact with each other only by the electrostatic attraction or when a long time is required to form a close contact, due to warp of the glass material and the molding die or fine concavity and convexity of the surfaces, it is effective to bring the surface of the glass, which is to be molded, and the surface of the die into close contact with each other by the external load to perform the molding. As a result, the molding can be stably performed over the entire larger area within a shorter period of time. Though the pressure may be applied prior to the application of the voltage, it is desirable that the application of the pressure be continued until the application of the voltage or be performed while the voltage is being applied. Further, it is desirable to keep the glass material and the molding die with pressing force for a certain period of time at the time of molding. As a result, the molding can be more efficiently performed by the effects of each of the applied pressure and the electrostatic attraction generated by the application of the voltage. The deformation caused by the applied pressure does not differ depending on the size of the molding pattern. The molding by the electrostatic attraction is more effective for a micropattern or the corner of the pattern, which has a small distance between the surfaces. Therefore, a synergic effect obtained by using the combination of the application of the pressure and the application of the voltage allows for more efficient molding.

It is desirable that the above-mentioned applied pressure be 100 Pa or larger. By setting the applied pressure to 100 Pa or larger, it is ensured that the surface of the glass, which is to be molded, and the surface of the die are brought into contact with each other to allow the electrostatic attraction to act thereon. It is desirable that the above-mentioned applied pressure be 1 MPa or smaller. By setting the applied pressure to 1 MPa or smaller, a possibility of damages to and breaking of the glass material or the molding die by the application of the pressure can be reduced. Specifically, it is desirable that the applied pressure be 100 MPa or larger and 1 MPa or smaller.

It is desirable that the above-mentioned molding be performed in a vacuum. By performing the molding in the vacuum, damages to the molding die such as oxidation of the die material at the time of molding at a high temperature can be prevented. Moreover, poor molding due to a residual gas present between the glass material and the molding die can be prevented. Further, it is desirable that a pressure of the residual gas in a vacuum atmosphere at the time of molding be 1 Pa or smaller. By setting the pressure of the residual gas to 1 Pa or smaller, it is possible to prevent a breakdown phenomenon due to glow discharge or the like between a high-voltage supply system and the other components in the apparatus.

It is also desirable that the above-mentioned molding be performed in a nitrogen gas atmosphere or an inert gas atmosphere. By performing the molding in the nitrogen gas atmosphere or the inert gas atmosphere, damages to the molding die at the time of molding at a high temperature can be prevented. Moreover, as compared with the case where the molding is performed in the vacuum, the apparatus can be reduced in size and simplified, and, in addition, a degree of freedom in apparatus configuration is improved.

Figure 5:
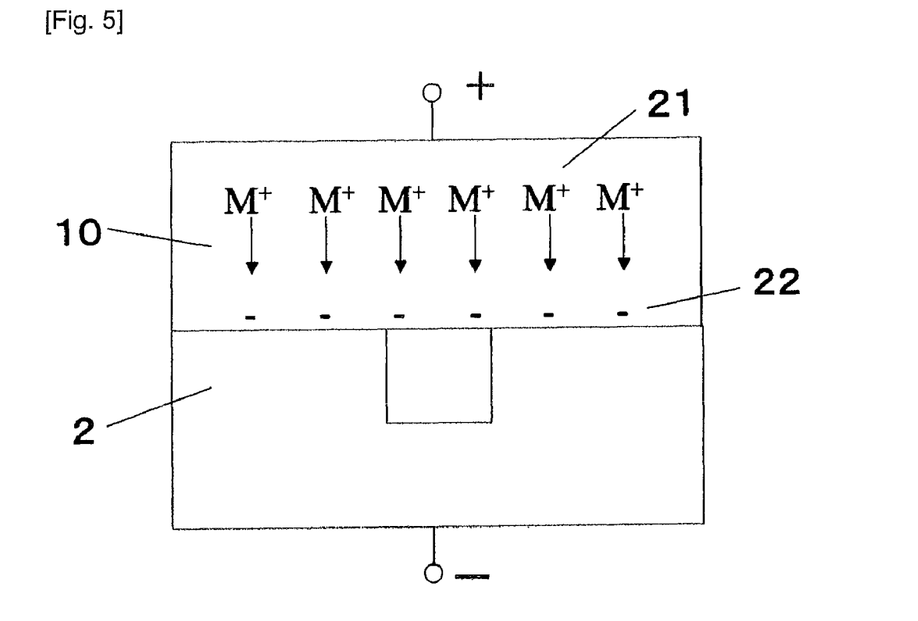
FIG. 5 is an explanatory view illustrating a method of releasing a molding die by application of a voltage opposite to the applied voltage at the time of molding.

After the molding, it is desirable to connect a positive electrode to the glass and a negative electrode to the molding die, to apply a direct-current voltage opposite to that applied at the time of molding before the release of the molding die from the glass material. By applying such a voltage, the alkali metal ions are migrated again toward the molded surface of the glass material, as shown in FIG. 5, to cancel the negative charges 22 accumulated in the vicinity of the molded surface. As a result, the positive charges are not induced in the surface of the molding die. Consequently, the electrostatic attraction between the molded surface of the glass and the surface of the molding die disappears, and hence the release of the molding die from the glass material is facilitated. At this time, as the electrodes for applying the voltage in the opposite direction to the glass material and the molding die, the electrodes used for applying the voltage at the time of molding can be used.

It is desirable to apply an alternating-current voltage between the glass material and the molding die before the release of the molding die from the glass material after the molding. By the application of the alternating-current voltage, the ion migration can be induced only in the vicinity of the molded surface of the glass to cancel the negative charges in the surface of the glass. As a result, the positive charges in the surface of the molding die are not induced. Consequently, the electrostatic attraction between the molded surface of the glass and the surface of the molding die disappears, and hence the release of the molding die from the glass material is facilitated. At this time, as the electrodes for applying the alternating-current voltage across the glass material and the molding die, the electrodes used for applying the voltage at the time of molding can be used.

Moreover, it is desirable that a heating temperature $T_1$ at the time of application of the voltage for the release of the die be higher than $(Tg-150)°$ C. when the glass transition temperature of the glass material is Tg. By setting the temperature in this range, the migration of the cations 21 in the glass is facilitated to facilitate the cancellation of the negative charges accumulated in the molded surface of the glass. Moreover, it is desirable that the heating temperature $T_1$ at the time of the application of the voltage for the release of the molding die be lower than Tg. By setting the temperature in this range, the deformation of the molded glass material after the release of the molding die can be restrained to keep profile accuracy of a molded product. Specifically, it is desirable that the heating temperature $T_1$ at the time of the application of the voltage for the release of the die be within the range of: $(Tg-150)°$ C.$<T_1<Tg°$ C. It is desirable that the voltage to be applied be adjusted by the heating temperature at the time of the application of the voltage. Specifically, when the voltage is applied at approximately the same temperature as that of the molding, the electrostatic attraction can be removed by the same voltage as that used for the molding or a smaller voltage. On the other hand, when the voltage is applied at a temperature remarkably lower than that used at the time of molding, it is desirable that the same voltage as that used for the molding or a larger voltage be applied to accelerate the ion migration.

Figure 6:
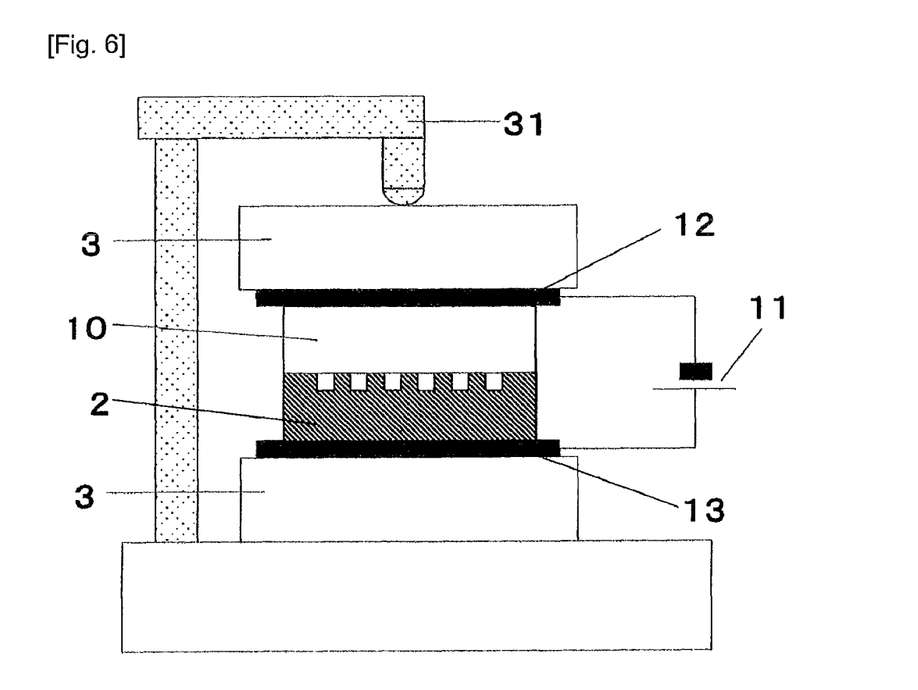
FIG. 6 is a front view illustrating a schematic configuration of a molding apparatus according to the present invention.

As illustrated in FIG. 6, the molding apparatus according to the present invention comprises: contact-holding means 31 for holding the glass material 10 and the molding die 2 in contact with each other; the heaters 3 for heating the glass material and the molding die; the power supply 11 and the electrodes 12 and 13 for applying the voltage across the glass material and the molding die. The molding apparatus is characteristic in that the molding is performed by the electrostatic attraction acting between the surface of the glass material and the surface of the molding die. The means for heating the glass material and the molding die is not limited to the heaters respectively provided above or below the glass material or the molding die, as illustrated in FIG. 6. Any form of the means for heating such as the arrangement of a heater or a lamp in the periphery or electromagnetic induction heating may be used as long as the glass material and the molding die are heated at a predetermined temperature.

It is desirable that the molding apparatus have an electrode for application of the voltage for the glass, which is brought into contact with the entire surface on the side opposite to the surface to be molded of the glass material. By using the electrode having such a shape, a strong electric field is uniformly applied to the glass to accelerate the ion migration, thereby obtaining a large electrostatic attraction. Moreover, a structure may also be such that a surface of the heater is made of a conductive material to be brought into contact with the entire surface on the side opposite to the surface to be molded of the glass material.

It is desirable that the molding apparatus be adapted to allow for the reversal of the polarity of the voltage to be applied to the glass material and the molding die. In this manner, the voltage opposite to that used for the molding can be applied prior to the release of the die to facilitate the release of the molding die from the glass material.

Figure 7:
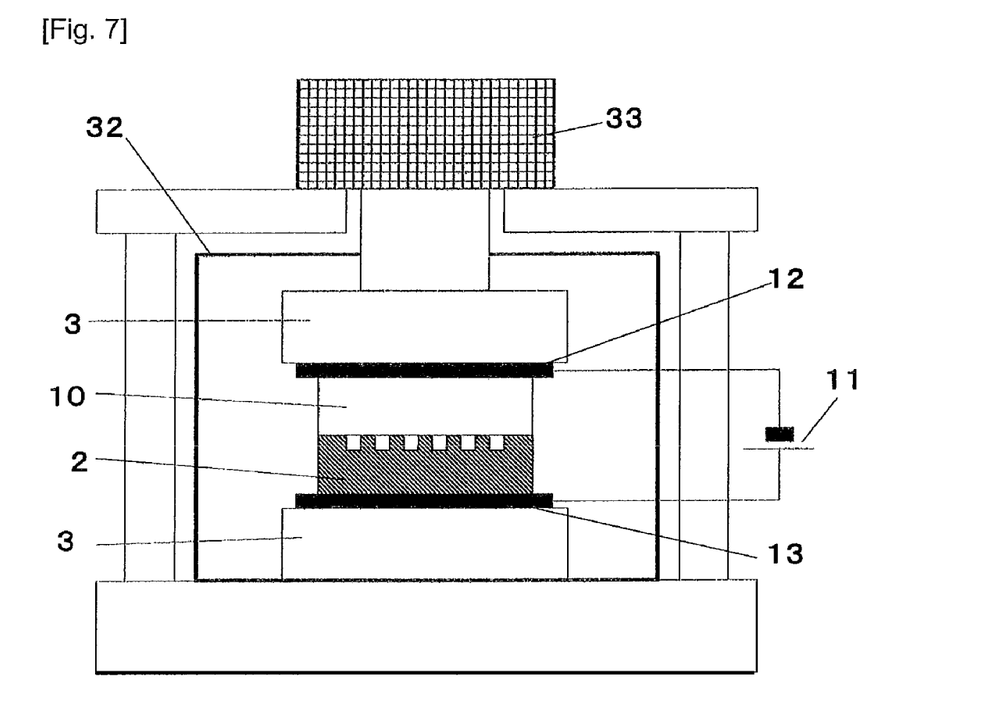
FIG. 7 is a front view illustrating a schematic configuration of a molding apparatus containing pressure means in the present invention.

It is also desirable that the molding apparatus comprise means 33 for holding the glass material and the molding die with pressing force, as illustrated in FIG. 7. A chamber 32 for evacuation to a vacuum or for atmosphere-control is illustrated in FIG. 7. When the molding is performed in an atmosphere, however, the configuration can be such that the chamber 32 is omitted.

It is desirable that the above-mentioned pressure means provide a pressure of 100 Pa or higher. By setting the applied pressure to 100 Pa or higher, it can be ensured that the surface to be molded of the glass and the surface of the molding die are brought into contact with each other to allow the electrostatic attraction to act thereon. It is also desirable that the pressure provided by the pressure means be 1 MPa or smaller. By setting the applied pressure to 1 MPa or smaller, a possibility of damages to and breaking of the glass material or the molding die due to the application of the pressure can be reduced. Specifically, it is desirable that the applied pressure of the pressure means be 100 Pa or higher and 1 MPa or smaller.

It is desirable that the molding apparatus comprise a vacuum chamber for performing the molding in a vacuum. By performing the molding in the vacuum, damages to the molding die such as oxidation of the die material at the time of molding at a high temperature can be prevented.

It is desirable that the molding apparatus comprise an atmosphere-controlling chamber for performing the molding in various gas atmospheres. The molding in the nitrogen gas or inert gas atmosphere with the atmosphere-controlling chamber allows for the prevention of the damages to the molding die at the time of molding at a high temperature.

The molding is performed in the following procedure. The glass material 10 and the molding die 2 are brought into contact with each other to be located between the electrodes 12 and 13. In the case of the molding in the vacuum atmosphere, the chamber 32 is evacuated to a vacuum by a vacuum pump (not shown). In the case of the molding in the atmosphere of various gases, a gas in the chamber is replaced by a desired gas such as a nitrogen gas by using an exhaust pump and gas introduction means, either not shown. Next, the glass material 10 and the molding die 2 are heated by the heaters 3. After the glass material and the molding die are heated to a predetermined temperature, the pressure is applied to the glass material 10 and the molding die 2 by the pressure-holding means 33. Then, the voltage is applied using the power supply 11 and the electrodes 12 and 13. In this case, any of the application of the pressure and the application of the voltage is started first. However, it is desirable that the application of the pressure and the application of the voltage be performed simultaneously. Further, when the application of the pressure is continued during the application of the voltage to hold the glass material 10 and the molding die 2 with pressing force, better molding is performed by a synergic effect of the application of the pressure and the electrostatic attraction.

Figure 8:
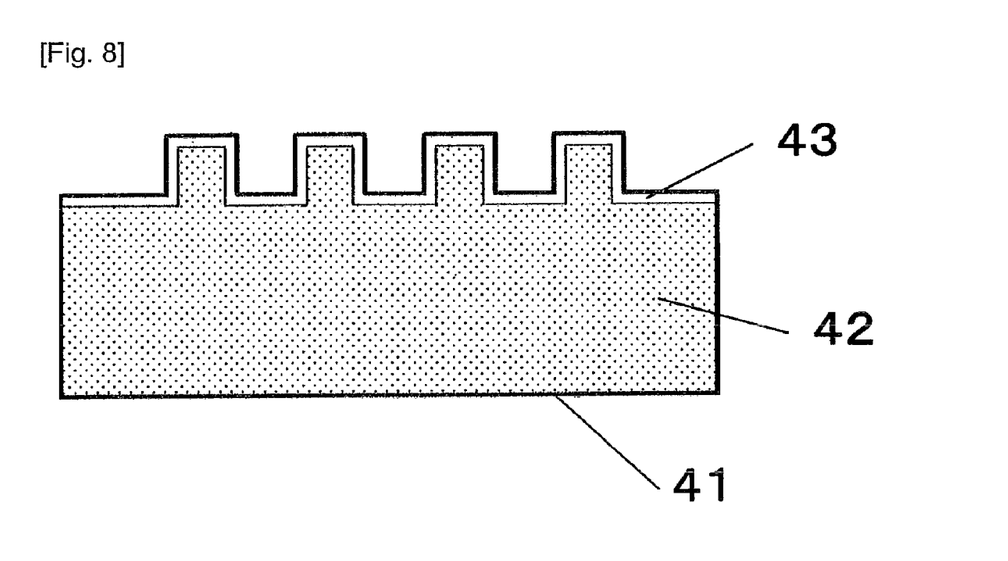
FIG. 8 is a sectional view illustrating a molded product of a glass according to the present invention.

FIG. 8 illustrates a molded product of the glass material according to the present invention. It is desirable that a molded product 41 of the glass material have a region 43 having a lowered concentration of the alkali metal, which is formed in the vicinity of the molded surface, as compared with that of the glass base material 42, as a result of contact of the molded surface with the molding die and the application of the voltage between the glass material and the molding die. By the formation of such a region having the lowered concentration of the alkali metal, the electrostatic attraction acts between the surface to be molded of the glass and the molding die at the time of molding. As a result, the molding at a low temperature with the application of a low pressure is made possible.

Moreover, it is desirable that a thickness of the region 43 having the lowered concentration of the alkali metal be 0.1 µm or larger and 5 µm or smaller. The region illustrated in FIG. 3, in which the negative charges 22 are accumulated, corresponds to the region 43 of the molded surface of the glass, which has the lowered concentration of the alkali metal, illustrated in FIG. 8. As the number of accumulated negative charges 22 becomes larger, the electrostatic attraction acting on the molded surface of the glass and the surface of the die becomes larger. Moreover, in the case where the applied voltage is the same, the amount of electric charges becomes larger as a thickness of a layer, in which the electric charges are accumulated, becomes smaller. Further, as a result of the concentration of the electric charges in the surface, the electrostatic attraction acting on the molded surface of the glass and the surface of the die effectively acts for the molding. However, the density of accumulated electric charges is limited in case of the glass which does not have electric conduction means with electrons. Therefore, in order to accumulates the amount of negative charges for generating a sufficiently large electrostatic attraction for the molding, it is desirable that the thickness of the region in which the negative charges are accumulated, that is, the region 43 having the lowered concentration of the alkali metal be 0.1 µm or larger. Moreover, in order to accumulate sufficient negative charges without application of an excessively high voltage to generate a sufficiently large electrostatic attraction for the molding, it is desirable that the thickness of the above-mentioned region 43 having the lowered concentration of the alkali metal be 5 µm or smaller.

EXAMPLES

The present invention will be described in more detail based on the following examples, but the invention is not intended to be limited thereto.

Example 1

Figure 9:
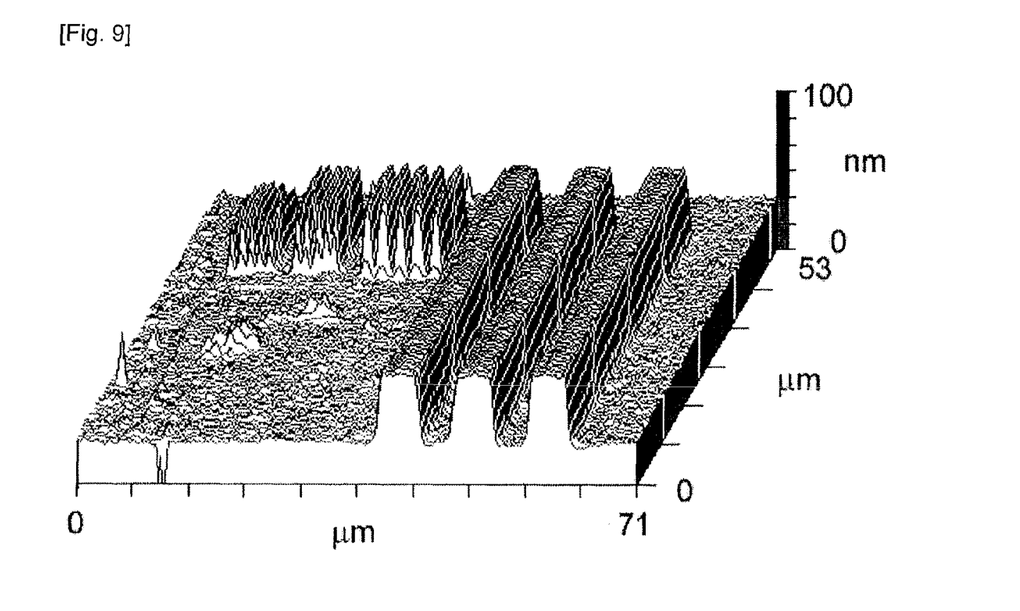
FIG. 9 is a view illustrating the surface profile of the glass after molding in Example 1 of the present invention.

For the molding, crown glass containing potassium (0200 glass produced by MATSUNAMI GLASS IND., LTD.) was used as the glass material, and a quartz substrate having a fine line-and-space pattern formed thereon was used as the molding die. On the surface of the die, a platinum layer having a thickness of 20 nm was formed. A glass transition temperature of the crown glass was 533° C. The above-mentioned components were placed in the molding apparatus having the configuration illustrated in FIG. 7. Then, the chamber was evacuated to a vacuum. Subsequently, the glass material and the molding die were heated to 440° C. while being kept in contact with each other. A voltage at 1 kV was applied in the state that the glass side was the negative electrode and the molding die side was the positive electrode to be kept for ten minutes. No load was applied at the time of molding. It was confirmed that a profile of the die was replicated to the surface of the glass after the molding, as illustrated in FIG. 9. As a deformation of the glass material, about 0.05 μm was obtained. The deformation scarcely depended on a line width of the pattern, and therefore, the molding with the micropattern was possible. In addition, even when the molding was repeated, no damage was observed in the molding die and good replication characteristics were obtained.

Example 2

With use of the crown glass and the molding die made of quartz, on which the platinum film was formed, the molding was performed by applying the voltage at the time of molding, while the applied pressure at 0.5 MPa was applied for ten minutes. The conditions other than the application of the pressure were the same as those of Example 1. As a result of the application of the pressure, molding ability was improved. As the deformation of the glass material, 0.2 μm was obtained.

Comparative Example 1

In Example 1, a film made of aluminum, chromium, titanium, silicon, tungsten or palladium in place of platinum was formed on the surface of the molding die made of quartz to perform the molding. The conditions other than the material of the metal film on the surface were the same as those of Example 1. When each of the films described above was formed on the surface of the die, the die and the glass were firmly bonded to each other. Therefore, the release of the die was difficult.

Comparative Example 2

In Example 1, a film made of silver, copper or molybdenum in place of platinum was formed on the surface of the molding die made of quartz to perform the molding. The conditions other than the material of the metal film formed on the surface were the same as those of Example 1. Though the release of the molding die from the glass was possible with each of the above-mentioned films, the metal film on the surface of the molding die was corroded. Therefore, the molding was difficult.

Comparative Example 3

Figure 10:
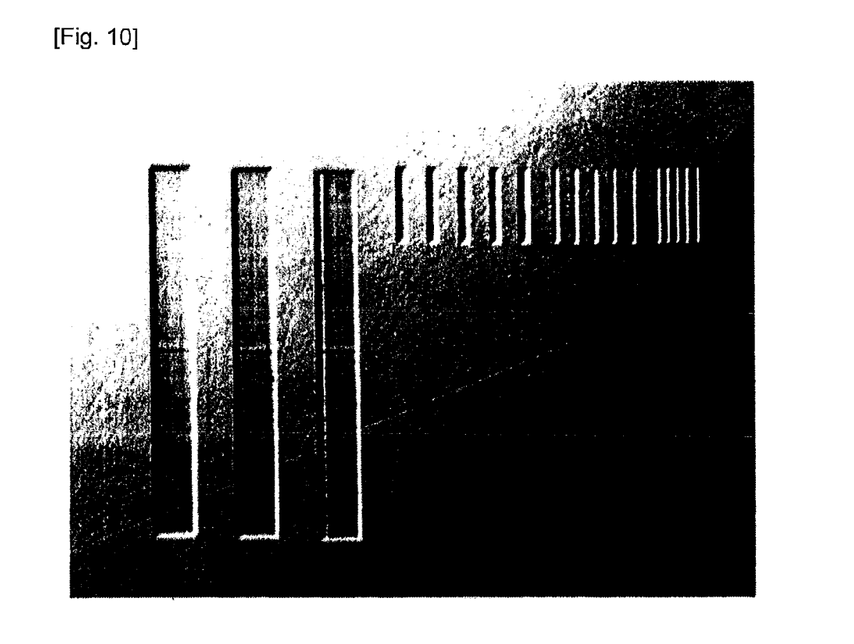
FIG. 10 is a view illustrating the surface of the molding die made of glassy carbon before the molding experiments in Comparative Example 3.
Figure 11:
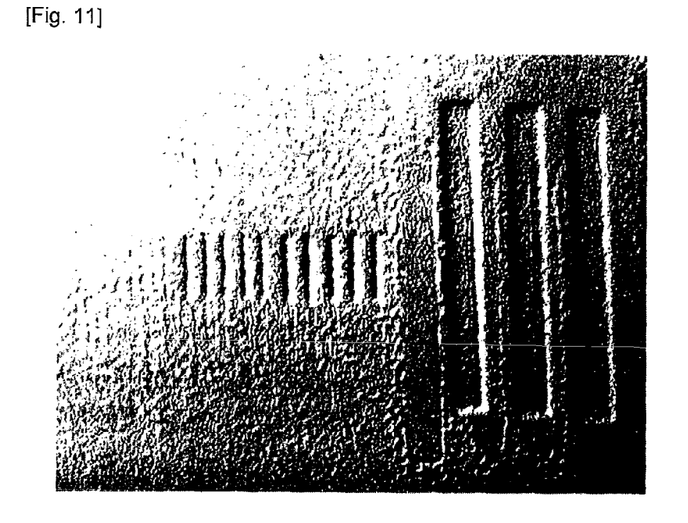
FIG. 11 is a view illustrating the surface of the molding die made of glassy carbon after the molding experiments in Comparative Example 3.

In Example 1, glassy carbon having a fine line-and-space pattern formed by a focused ion beam processing apparatus was used as the molding die. The conditions other than the material of the molding die and the fabrication method thereof were the same as those of Example 1. The molding die made of glassy carbon was easily releasable from the glass. As the deformation of the glass material, 0.05 μm was obtained. At this time, the result of observation of the molding die made of glassy carbon before the molding with a Nomarski differential interference microscope is illustrated in FIG. 10, and the result of observation of the molding die after four-time molding experiments is illustrated in FIG. 11. Though these molding dies made of glassy carbon were fabricated in the same procedure, the surface of the molding die made of glassy carbon after the molding experiments was heavily corroded. Therefore, the profile accuracy of the molded product remarkably degraded, resulting in difficulty in repeated molding.

Comparative Example 4

The crown glass, and the molding die made of quartz, on which the platinum film was formed, were used. The pressure at 0.5 MPa and 2 MPa were applied at the time of molding to perform the molding without application of the voltage between the glass material and the molding die. The conditions other than the no application of the voltage and the applied pressure were the same as those of Example 2. With no application of the voltage, the molding was difficult at the above-mentioned temperature. The deformation of the glass material was not confirmed at any of the pressure forces.

Comparative Example 5

Figure 12:
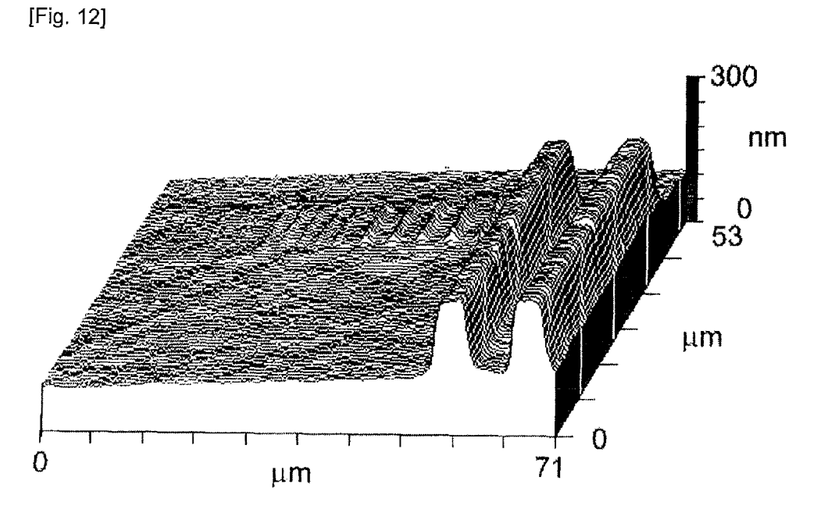
FIG. 12 is a view illustrating the surface profile of the glass after molding at 550° C. in Comparative Example 5.

The crown glass, and the molding die made of quartz, on which the platinum film was formed, were used. The molding was performed at 540° C. and 550° C. without application of the voltage. The applied pressure was 1 MPa. The deformation of the glass material was 0.1 μm at the heating temperature of 540° C. and was about 0.2 μm at the heating temperature of 550° C. The molding was made possible by increasing the molding temperature. FIG. 12 shows the result of molding at 550° C. When the molding was performed without application of the voltage, the result of molding greatly depended on the line width of the pattern. Though the molding was possible with the pattern having a large line width, the molding was difficult with a smaller line width.

As described above, in the molding of the glass material, it is effective for the molding of the glass material to apply the voltage across the glass material and the molding die to cause the electrostatic attraction to act between the surface to be molded of the glass and the surface of the die. As a result, in comparison with the case where the voltage is not applied, the molding at a lower temperature can be performed. In addition, the molding with a smaller pressure force can be performed. Further, even with the small line width of the pattern, the molding is possible.

Example 3

The molding was performed at 440° C. and 500° C. using pyrex glass (pyrex: registered trademark) manufactured by Asahi Techno Glass Co., Ltd. as the glass material. The conditions other than the temperatures at the time of molding were the same as those of Example 1. Though the deformation was about 0.01 μm at 440° C., the deformation of 0.2 μm was obtained by the molding at 500° C. Though the pyrex glass having a high softening temperature requires a high temperature for the molding, the effects of the application of the voltage are the same as those of Example 1.

INDUSTRIAL APPLICABILITY

The present invention is used for mold processing of glass, such as the formation of a micropattern on the surface of the glass. In particular, despite the problems in the conventional glass molding methods, such as the temperature at the time of molding and the pressing in a high-temperature state, the molding at a lower temperature with the application of a smaller pressure is made possible. Therefore, the mold processing of glass with a simpler apparatus is realized. Moreover, the molding is performed with the electrostatic attraction between the surface of the glass, which is to be molded, and the surface of the molding die, and hence the present invention is suitable for the molding over a large area. As a result, the molding cost of the molded products of glass is reduced, while the application of the present invention is made possible in various fields such as various optical components such as optical elements used for the display device, the optical control device employing the MEMS, the biochemical analysis device called μ-TAS, the micro-total analysis device, and the micro-chemical synthesis device.

The invention claimed is:

1. A method of molding a glass material, comprising the steps of:
heating a glass material and a molding die with a heater;
applying a voltage across the glass material and the molding die while the glass material and the molding die are being held in contact with each other;
wherein a negative direct-current voltage is applied to the glass material via an electrode in contact with the glass material, and wherein a positive direct-current voltage is applied to the molding die, and
performing glass material pressure-molding by electrostatic attraction generated between a surface of the glass material and a surface of the molding die to produce a molded glass product with a lowered concentration of an alkali metal in a molded surface of the molded glass product.

2. The method of molding a glass material according to claim 1, wherein the glass material contains a mobile ion.

3. The method of molding a glass material according to claim 2, wherein the glass material comprises silicon dioxide as a main component, and lithium, sodium or potassium corresponding to an alkali metal as the mobile ion.

4. The method of molding a glass material according to claim 1, wherein the temperature T for heating the glass material and the molding die is within a range of: $(T_g-150)°$ C. $<T<(T_g+100)°$ C. (in which "$T_g$" represents a glass transition temperature of the glass material).

5. The method of molding a glass material according to claim 1, wherein the applied voltage is 10 V or larger and 10,000 V or less.

6. The method of molding a glass material according to claim 1, further comprising a step of applying a pressure to the glass material and the molding die after the step of heating the glass material and the molding die.

7. The method of molding a glass material according to claim 6, wherein the applied pressure is 100 Pa or larger and 1 MPa or smaller.

8. The method of molding a glass material according to claim 1, wherein the molding is performed in a vacuum, a nitrogen gas atmosphere or an inert gas atmosphere.

9. The method of molding a glass material according to claim 1, wherein a positive direct-current voltage is applied to the glass material and a negative direct-current voltage is applied to the molding die, prior to release of the molding die after the molding.

10. The method of molding a glass material according to claim 1, wherein an alternating-current voltage is applied across the glass material and the molding die, prior to the release of the molding die after the molding.

11. The method of molding a glass material according to claim 9, wherein the heating temperature $T_1$ at the time of applying the voltage is within a range of: $(T_g-150)°$ C. $<T_1<T_g°$ C. (in which "$T_g$" represents a glass transition temperature of the glass material).

12. The method of molding a glass material according to claim 10, wherein the heating temperature $T_1$ at the time of applying the voltage is within a range of: $(T_g-150)°$ C. $<T_1<T_g°$ C. (in which "$T_g$" represents a glass transition temperature of the glass material).

13. A molding apparatus of a glass material, comprising:
means for holding a glass material and a molding die in contact with each other;
means for heating the glass material and the molding die; and
means for applying a voltage across the glass material and the molding die comprising a positive electrode connected to the molding die and a negative electrode connected to the glass material, wherein the negative electrode is brought into contact with an entire surface of the glass material on a side opposite to a surface which is to be molded; and
wherein press-molding is performed by electrostatic attraction acting between a surface of the glass material and a surface of the molding die to produce a molded glass product with a lowered concentration of an alkali metal in a molded surface of the molded glass product.

14. The molding apparatus of a glass material according to claim 13, wherein a conductive film formed on a surface on a side opposite to a surface, which is to be molded, of the glass material is employed as an electrode for performing electrical connection to the glass material.

15. The molding apparatus of a glass material according to claim 13, wherein the molding die is a conductor.

16. The molding apparatus of a glass material according to claim 15, wherein the molding die is formed of a material containing any one of platinum, iridium, rhodium, osmium and ruthenium as a main component, or a material containing a mixture of at least two of the materials as a main component.

17. The molding apparatus of a glass material according to claim 15, wherein a thin film made of a material containing any one of platinum, iridium, rhodium, osmium and ruthenium as a main component, or a material containing a mixture of at least two of the materials as a main component, is formed on a surface of the molding die.

18. The molding apparatus of a glass material according claim 13, wherein a depth of a molding pattern of the molding die is 1 μm or less.

19. The molding apparatus of a glass material according to claim 13, comprising means for reversing polarity of the voltage applied to the glass material and the molding die.

20. The molding apparatus of a glass material according to claim 13, comprising means for holding the glass material and the molding die with pressing force.

21. The molding apparatus of a glass material according to claim 20, wherein an applied pressure at the time of holding with pressing force is 100 Pa or larger and 1 MPa or smaller.

22. The molding apparatus of a glass material according to claim 13, comprising a vacuum chamber for performing the molding in a vacuum or an atmosphere-controlling chamber for performing the molding in various gas atmospheres.

\* \* \* \* \*